US007370889B2

(12) United States Patent
Maunder et al.

(10) Patent No.: US 7,370,889 B2
(45) Date of Patent: May 13, 2008

(54) TUBE CONNECTOR

(75) Inventors: Roy Peter Maunder, Hampshire (GB); David Whitmore Hilton, Hampshire (GB)

(73) Assignee: Bio Pure Technology Limited, Havant, Hampshire (GB)

( * ) Notice: Subject to any disclaimer, the term of this patent is extended or adjusted under 35 U.S.C. 154(b) by 171 days.

(21) Appl. No.: 11/053,657

(22) Filed: Feb. 7, 2005

(65) Prior Publication Data

US 2005/0189765 A1 Sep. 1, 2005

(30) Foreign Application Priority Data

Feb. 5, 2004 (GB) .................. 0402564.9

(51) Int. Cl.
*F16L 33/00* (2006.01)
(52) U.S. Cl. ................. 285/242; 285/148.17; 285/322; 285/921
(58) Field of Classification Search ........... 285/148.14, 285/148.17, 239, 242, 257, 417, 921, 81, 285/259, 322
See application file for complete search history.

(56) References Cited

U.S. PATENT DOCUMENTS

| 1,486,421 | A | * | 3/1924 | Dyer ........................... 285/243 |
| 2,453,997 | A | * | 11/1948 | MacWilliam ................ 285/256 |
| 3,174,777 | A | * | 3/1965 | Lodholm et al. ............ 285/252 |
| 3,245,699 | A | * | 4/1966 | Peterman ..................... 285/110 |
| 4,257,629 | A | * | 3/1981 | Maple et al. .................. 285/12 |
| 4,369,992 | A | * | 1/1983 | Fournier et al. ............ 285/256 |
| 5,137,309 | A | * | 8/1992 | Beagle ........................ 285/256 |
| 5,358,012 | A | * | 10/1994 | Kish ........................... 138/109 |
| 5,387,016 | A | * | 2/1995 | Joseph et al. ........... 285/148.16 |
| 6,010,162 | A | * | 1/2000 | Grau et al. ................. 285/257 |

* cited by examiner

*Primary Examiner*—Aaron Dunwoody
*Assistant Examiner*—Fannie C. Kee
(74) *Attorney, Agent, or Firm*—Alfred A. Fressola; Ware, Fressola, Van Der Sluys & Adolphson LLP

(57) ABSTRACT

A connector for a tube comprises a hollow spigot and an outer securing member for capturing a tube therebetween. The hollow spigot includes an internal bore matched to that of the tube, a tapered end with a frusto-conical length and its small diameter at its distal end and a parallel length inwards of the tapered end, with a diameter less than the maximum tapered diameter and an annular rib inwards of the parallel length to provide an end stop for the tube when fitted onto the spigot. The outer securing member includes an internal tapered bore matched to the frusto-conical length and of respectively increased diameter to accommodate the tube therebetween and at least one latch formation spaced from the member's large tapered end for engaging behind the annular rib.

2 Claims, 4 Drawing Sheets

TUBE CONNECTOR

CROSS-REFERENCE TO RELATED APPLICATION

The present application claims priority under 35 USC §119 to United Kingdom Patent Application No. 0402564.9 filed on Feb. 5, 2004.

TECHNICAL FIELD

The present invention relates to a tube connector, particularly though not exclusively, for use in contamination sensitive applications.

BACKGROUND OF THE INVENTION

Fluid connections in food and pharmaceutical industries are commonly made with flanged connectors clamped to each other. The connectors have hollow spigots to which tubing is connected in a fluid-tight manner. The flanged connectors can be made to tight tolerances, as can seals between two flanges, whereby there is little scope for stagnant accumulation at the flanges per se of material which can become contaminated, for instance by bacteria, and hence cause a hazard.

However the connection between the hollow spigot and the tubing can provide a stagnant region and a potential hazard. This arises because the nose of the connector's spigot is tapered where it meets the tube. The latter is close to its free diameter at the small diameter end of the spigot and there is little resistance to pressurised fluid permeating between the spigot and the tube. The pressure of the fluid is liable to force the fluid right up the taper and cause a leak or at least leave a residue of the fluid between the tube and the taper.

SUMMARY OF THE INVENTION

The object of the present invention is to provide an improved tube connector.

According to the invention there is provided a connector for a tube comprising:
a hollow spigot having:
an internal bore matched to that of the tube,
a tapered end with a frusto-conical length and its small diameter at its distal end and
a parallel length inwards of the tapered end, with a diameter less than the maximum tapered diameter and
an annular rib inwards of the parallel length to provide an end stop for the tube when fitted onto the spigot and
an outer securing member having:
an internal tapered bore matched to the frusto-conical length and of respectively increased diameter to accommodate the tube therebetween and
at least one latch formation spaced from the member's large tapered end for engaging behind the annular rib.

In the preferred embodiment, the or each latch formation is resiliently connected to the rest of the securing member to spring over the annular rib and latch behind it when the outer securing member is urged along the tube having the spigot in its end.

Preferably latch retaining means in the form of a collet will be provided for holding the latches in place behind the rib and thus holding the securing member in place.

Alternatively, the securing member can have its latch formation rigidly moulded to it and be formed to receive a clip having at least one additional latch formation, the clip having formations for radial fitting thereof to the securing member, which has complementary formations.

The securing member can rely on its and the clip's formations to provide longitudinal connection of the clip to the securing member and hence via the clip's latch formation(s) holding of the securing member in its tube securing position. However, again in the preferred embodiment additional complementary longitudinal connection is provided.

BRIEF DESCRIPTION OF THE DRAWINGS

To help understanding of the invention, a specific embodiment thereof will now be described by way of example and with reference to the accompanying drawings, in which.

DETAILED DESCRIPTION

Figure 1:
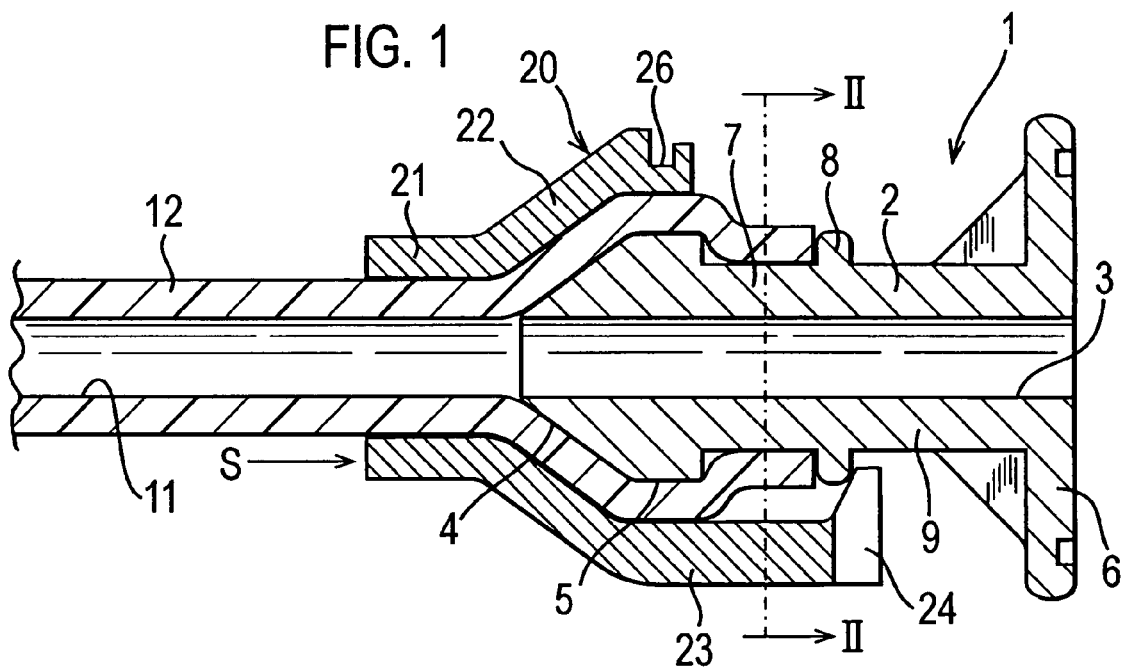
FIG. 1 is a cross-sectional side view of a tube fitted to a tube connector with a partially assembled securing member.
Figure 2:
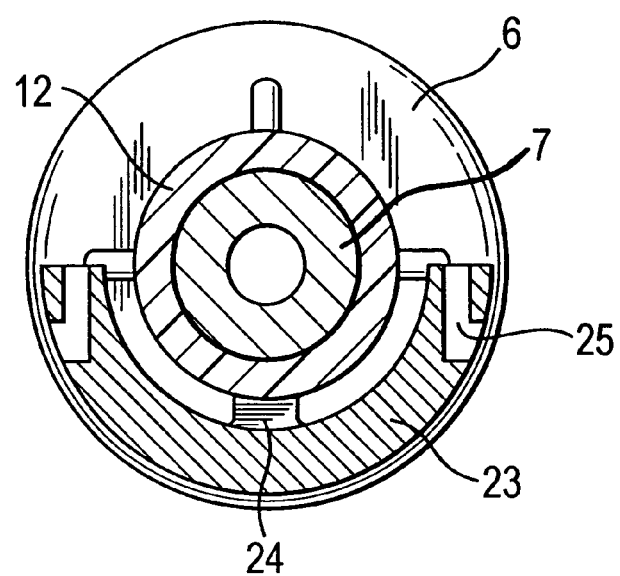
FIG. 2 is a cross-sectional end view of the assembly of FIG. 1, the view being on line II-II.

Referring to FIGS. 1 to 4 of the drawings, the tube connector 1 has a flanged spigot 2 with a uniform bore 3 of the same size as the internal bore 11 of an elastomeric tube 12 that is to be connected by the connector.

The spigot has a frusto-conical end 4, backed up by a short length 5 having a uniform diameter the same as the maximum conical diameter. Next towards the flange 6 is a plain length 7 of lesser diameter. Then there is an annular rib 8 of diameter greater than that of the short length and finally a further length 9 to the flange.

For holding the tube on the spigot an outer collar 20 is provided. It has a plain outer end 21 with an internal diameter the same as that of the outer diameter of the tube. Next to the plain end it has an outwards tapering length 22. This follows the taper of the spigot, i.e. has the same angle, and has the same length. The flange end 23 of the collar has a constant internal diameter. From a position corresponding to midway along the short length 5, the end 23 is semicircular in cross-section. At its terminal end, it carries a latch protrusion 24 inwards. This is positioned with respect to the taper 22 to latch behind the annular rib and retain the collar in position gripping the tube to the spigot.

Figure 3:
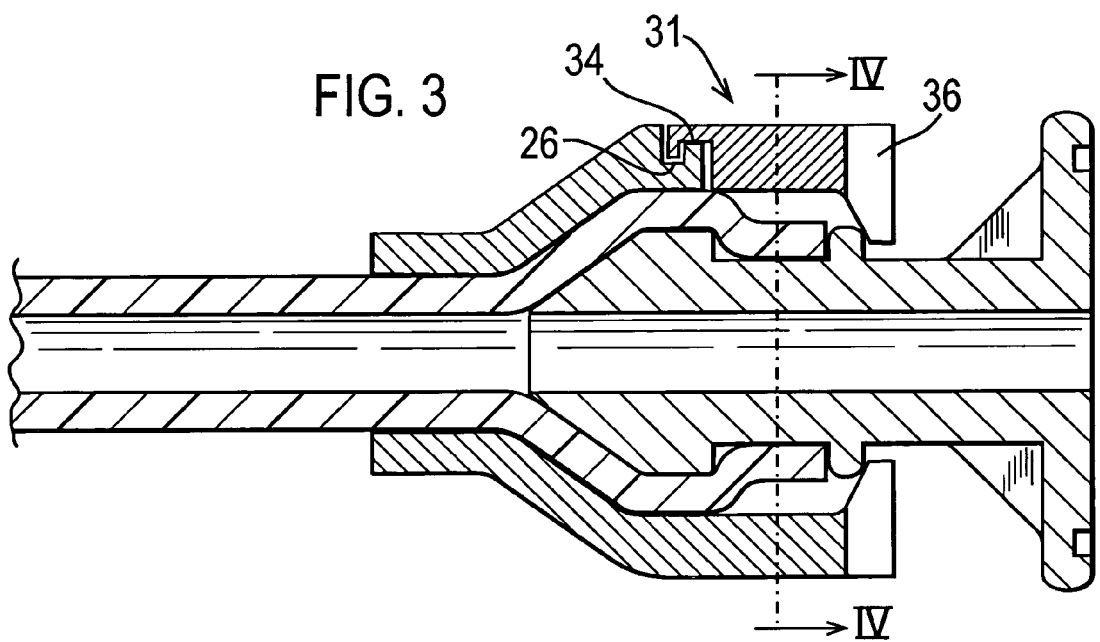
FIG. 3 is a cross-sectional side view similar to FIG. 1 with the securing member fully assembled.
Figure 4:
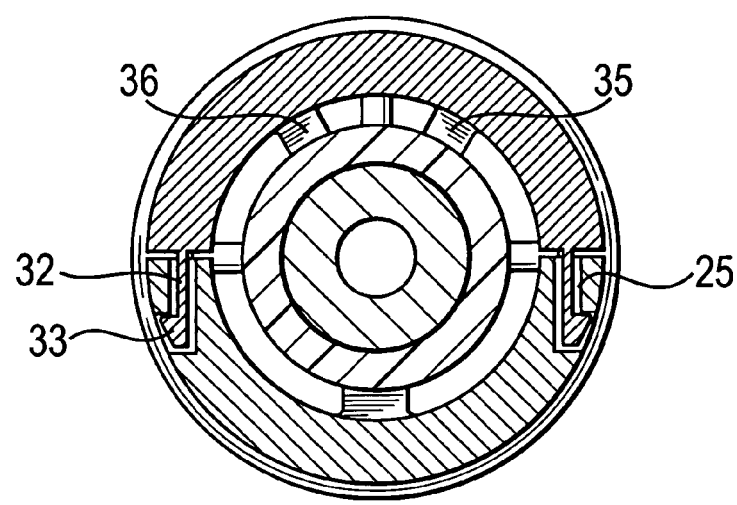
FIG. 4 is a cross-sectional end view on the line IV-IV in FIG. 3.

Referring to FIGS. 3 & 4, the collar is completed in its semicircular length 23 by a clip 31. This has tongues 32 with barbed end 33 for engaging in slots 25 in the semicircular length. The collar and the clip 31 have complementary inter-engaging grooves 26, 34 for holding these components in the axial relationship. The clip has two latch protrusions 35,36, similar to 24.

In use the tube is slid onto the spigot as far as the annular rib, the collar having been added first. With the tube on the spigot, some tension can be applied, which tends to reduce the diameter of the tube and cause it to grip the spigot. The collar is slid back over the tube on the spigot, assisted by this reduction, in the direction of the arrow S in FIG. 1. The latch 24 is engaged. The clip is then radially fitted, with its latches engaging the annular rib as well. The grooves engage and the barbs hook into the slots 25. The collar is thus held fast on the tube and the spigot, with the tube gripped between the two tapers.

Application of pressure in the tube does not cause the liquid in the tube to run up the tapers, because the tube is constrained against expanding radially.

Figure 5:
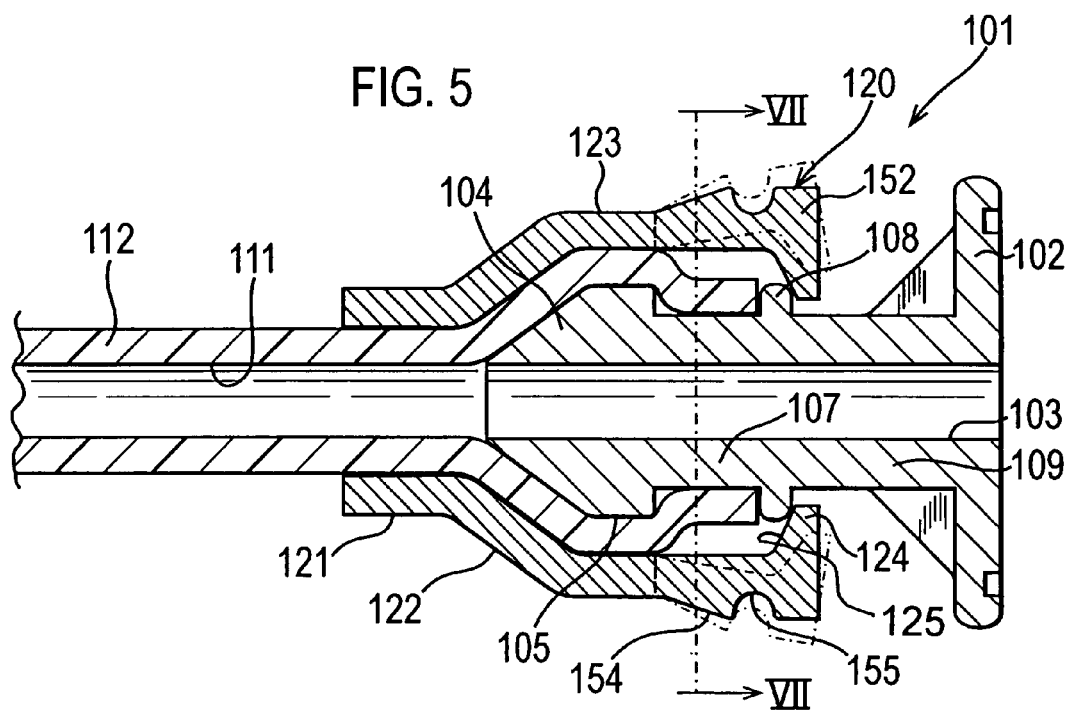
FIG. 5 is a cross-sectional similar to FIG. 1 of a second tube connector in accordance with the invention, partially assembled.
Figure 6:
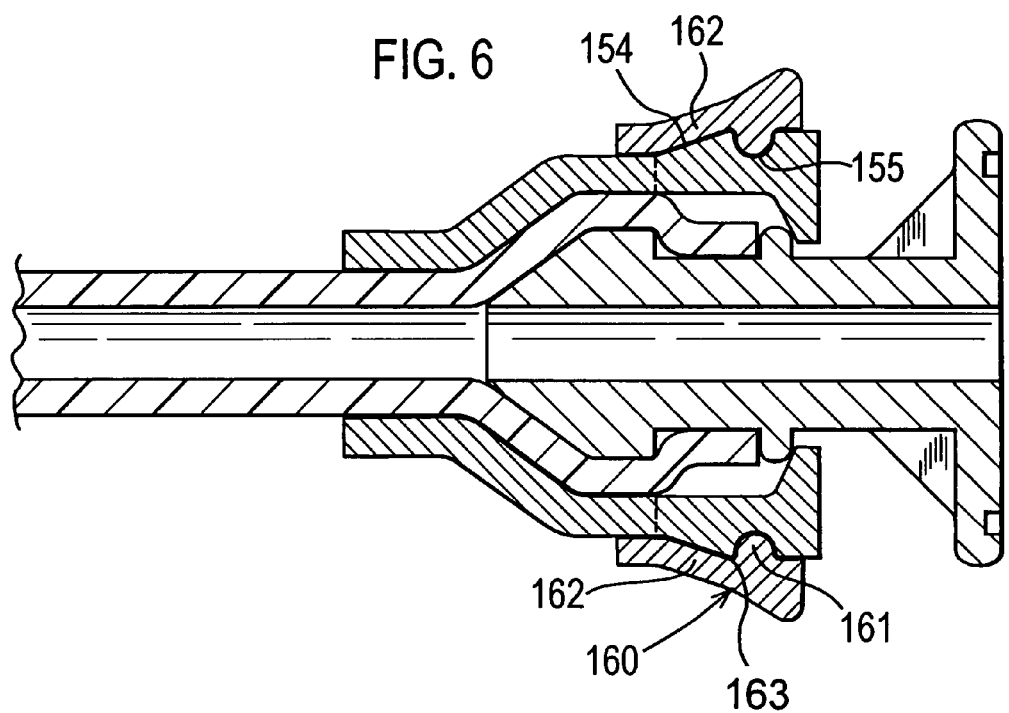
FIG. 6 is a similar view of the tub e connector fully assembled.
Figure 7:
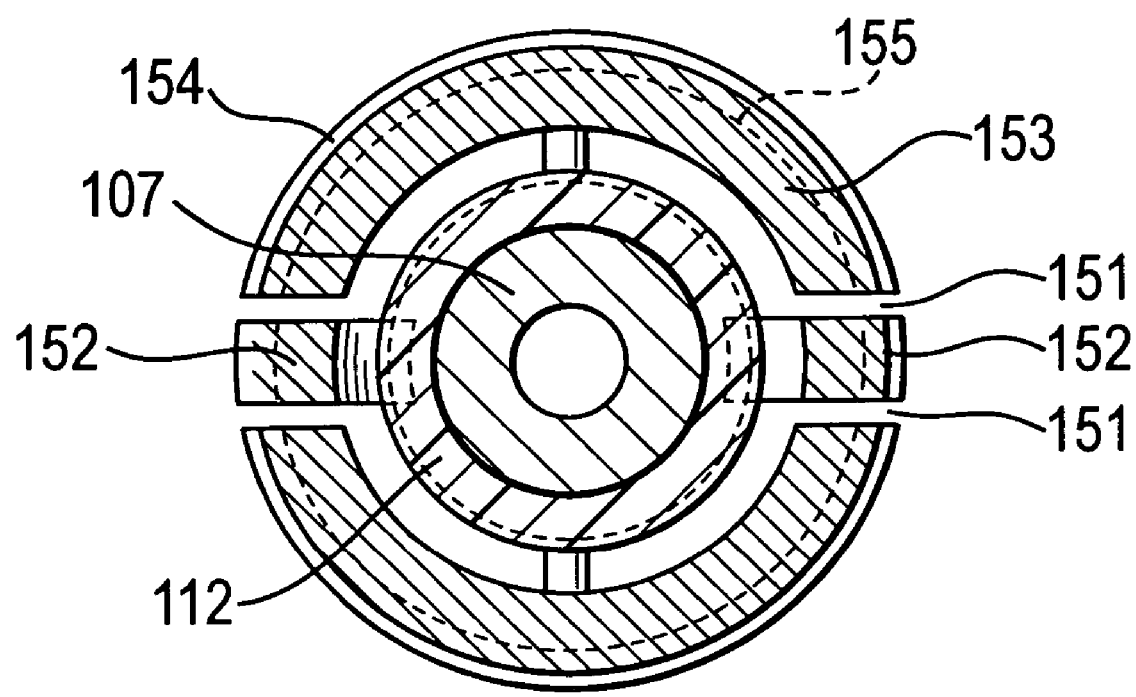
FIG. 7 is a cross-sectional end view on the line VII-VII in FIG. 5

Referring to now to FIGS. 5 & 6, another embodiment will now be described. The tube connector 101 has a flanged spigot 102 with a bore 103, similar to the spigot 2 and bore 3, of the same size as that of an elastomeric tube 112 with an internal bore 111. The spigot has an outwards pointing, frusto-conical end 104, a short straight length 105 of uniform diameter, a plain length 107 of lesser diameter, an annular rib 108 and a further length 109 to the flange.

For holding the tube on the spigot an outer collar 120 is provided. Again, it has a plain outer end 121 with an internal diameter the same as that of the outer diameter of the tube. Again, it has an outwards tapering length 122, following the taper of the spigot. The flange end 123 of the collar has a constant internal diameter at least over the greater part of its length. From a position corresponding to step between the lengths 105,107, the collar has four slits 151. These define two fingers 152 which have a minor circumferential extent and two shells 153, with a major circumferential extent. The fingers are flexible, whilst the shells are stiff.

At their terminal ends, each finger carries a latch protrusion 124 inwards. These are positioned with respect to the taper 122 to latch behind the annular rib and retain the collar in position gripping the tube to the spigot. To assist them in this function, a surrounding collet 160 is provided. The fingers and the shells have external ramps 154 and grooves 155. The collet has an internal ridge 161. Urging of the collet from the cone end of the spigot and over the collar brings the ridge into contact with the ramps. This urges the protrusions 124 into contact with the rib 108. They have angled abutment surfaces 125, which act to pull the collar towards the spigot. The collet comes to rest with its ridge in the grooves 155 and a complementary section 162 abutting the ramps 154. The outer surface 163 of the collar is contoured for ease of pushing of the collar into position.

Again, application of pressure in the tube does not cause the liquid in the tube to run up the tapers, because the tube is constrained against expanding radially, the constraint being at both at the tapered portion of the collar and at its plain outer end.

The invention is not intended to be restricted to the details of the above-described embodiments. For instance, in the first embodiment, the collar can be provided with shallow annular ridges internally of its taper, to further enhance the gripping of the tube onto the spigot. Further, the collar and the clip can be provided with one or more centering formations in the bore of the length 23 inwards of the latches. In the second embodiment, three or more fingers could be provided.

What is claimed is:

1. A connector for a tube comprising:
   a hollow spigot having:
   an internal bore matched to that of the tube,
   a tapered end with a frusto-conical length and its small diameter at its distal end and
   a parallel length inwards of the tapered end, with a diameter less than the maximum tapered diameter and an annular rib inwards of the parallel length to provide an end stop for the tube when fitted onto the spigot and
   an outer securing member having:
   an internal tapered bore matched to the frusto-conical length and of respectively increased diameter to accommodate the tube therebetween and
   at least one latch formation spaced from the member's large tapered end for engaging behind the annular rib
   latch retaining means in the form of a collet is provided for holding each latch in place behind the rib and thus holding the securing member in place.

2. The connector for a tube as claimed in claim 1, wherein each latch formation is resiliently connected to the rest of the securing member to spring over the annular rib and latch behind it when the outer securing member is urged along the tube having the spigot in its end.

* * * * *

UNITED STATES PATENT AND TRADEMARK OFFICE
CERTIFICATE OF CORRECTION

PATENT NO. : 7,370,889 B2
APPLICATION NO. : 11/053657
DATED : May 13, 2008
INVENTOR(S) : Maunder et al.

It is certified that error appears in the above-identified patent and that said Letters Patent is hereby corrected as shown below:

At column 3, line 26, please insert the word --the-- after the word "to".

Signed and Sealed this

Nineteenth Day of August, 2008

JON W. DUDAS
*Director of the United States Patent and Trademark Office*